United States Patent Office 2,825,733
Patented Mar. 4, 1958

2,825,733
METHOD FOR MAKING METAL PHTHALO-CYANINE PIGMENTS

Henry J. Kehe and Samuel E. Horne, Jr., Akron, Ohio, assignors to The B. F. Goodrich Company, New York, N. Y., a corporation of New York No Drawing. Application September 28, 1954
Serial No. 458,978

10 Claims. (Cl. 260—314.5)

This invention relates to a process or method for producing phthalocyanine colors or pigments. In particular, the present invention relates to a novel method for catalyzing phthalocyanine forming materials to produce metal phthalocyanine coloring compounds or compositions.

"Catalysts" have long been used in the process of producing phthalocyanine pigments. Some of these materials are not strictly catalysts, for while catalyzing or promoting the reaction, they are altered and usually cannot be recovered in their original condition and reused as during the reaction some physical or chemical change occurs such that they are not merely poisoned. These catalysts do not usually enter into the resulting phthalocyanine pigment molecule itself and generally comprise a metal or metal compound in which the metal is usually different from that to be obtained in the final metal phthalocyanine molecule. Many catalysts have been proposed in the past such as metals, metal salts, metal oxides, and the like. However, when using these metal or metal compounds as catalysts, it has been observed that the yields of pigment obtained are considerably less than the theoretical resulting in an uneconomical process. Moreover, some catalysts require removal of a considerable amount of water or other materials before the reaction can start, are bulky, or are corrosive. Others can also produce pigments which after finishing and pasting are dirty, off shade, etc. Hence, the catalysts heretofor employed have not resulted in an entirely satisfactory process for producing metal phthalocyanine pigments.

Therefore, it is a primary object of the present invention to provide a novel method for producing metal phthalocyanine pigments characterized by providing high yields of pigments of good color.

It is another object of this invention to provide a method for producing metal phthalocyanine pigments employing a catalyst which is noncorrosive and which avoids the necessity for long heat-up periods prior to reaching the actual reaction temperature range.

Another object is to provide a method for making metal phthalocyanine pigments in high yields by employing as a catalyst a particular type of inorganic ester.

Yet another object is to provide a method for making metal phthalocyanine pigments in high yields by using a catalyst comprising a titanium or zirconium ester.

These and other objects and advantages of the present invention will become more apparent to those skilled in the art from the following detailed description and examples.

According to the present invention, metal phthalocyanine pigments can be obtained in high yields by utilizing in the phthalocyanine reaction as a catalyst a minor amount of at least one hydrolyzable ester of an oxide gel-forming element having an atomic weight of at least 28. The organic portion of the ester molecule should be selected from the groups consisting of alkyl, aryl, alkaryl and aralkyl radicals and mixtures thereof. Preferably, the catalysts comprise a titanium or zirconium ester and mixtures of these esters which are easy to prepare and which afford consistently high yields of pigment. Pigments obtained by practice of the novel method of the present invention are clean and small in size; and the yields of such pigments are very close to the theoretical yields. A feature of the method of present invention is that it employs noncorrosive catalysts and does not require a long heat-up period to remove a considerable amount of water and other volatiles before the actual best reaction temperature range is reached.

The catalyst used in the method of the present invention comprises at least one hydrolyzable ester of at least one oxide gel-forming element having an atomic weight of at least 28 such as antimony, arsenic, bismuth, hafnium, lead, silicon, tantalum, thorium, titanium, tungsten, vanadium and zirconium. Other elements such as cerium, columbium and germanium may also be used where economically available. These elements are found in groups IV, V and VI of the periodic table according to Mendeleeff. Carbon and nitrogen, having atomic weights less than 28, do not provide useful catalysts. The organic portion or radical of the ester catalyst may comprise the residue of an alkyl or aralkyl hydroxy compound such as methanol, ethanol, isopropanol, butanol, benzyl alcohol, etc., or of an aryl or alkaryl hydroxy compound such as phenol, cresol, ethyl phenol and the like. Preferably a monohydroxy alkyl, aryl, alkaryl or aralkyl compound is used to avoid the formation of gums. The substituted products of the organic radicals or derivatives thereof may also be employed provided that they do not adversely affect the formation of the ester or the phthalocyanine reaction.

The ester catalysts can be prepared by a number of methods. One way is to react the halide, such as the chloride, of the selected element of the periodic table with an excess of the alcohol under anhydrous conditions in an inert organic diluent or solvent and in the presence of ammonia or an amine. At the end of the reaction the ammonium chloride produced, if ammonia has been used, can be filtered from the reaction mass and the filtrate distilled to remove the organic diluent and excess alcohol. The residue remaining in the flask, the ester, can then be used directly. In the reaction it is preferred to use the ortho halide of the element, that is the halide of the element, containing the highest number of halide atoms. For example, in the case of titanium it is preferred to use titanium tetrachloride rather than titanium trichloride since the ester obtained is more stable and under conditions of reaction in the phthalocyanine synthesis more centers for catalytic activity are thereby provided. In preparing the catalyst, mixtures of the halides of the elements can also be reacted with mixtures of the alkyl, aryl, alkaryl and/or aralkyl hydroxy compounds and then used in the phthalocyanine reaction. Likewise mixtures of separately prepared esters, alkyl, aryl, alkaryl and/or aralkyl of one or more of the elements can be used at the same time in the phthalocyanine reaction.

It, thus, is seen that the catalysts disclosed herein can be represented by the general formula:

$$E(OR)_x$$

where E is at least one element selected from groups IV, V and VI of the periodic table and having an atomic weight of at least 28, where O is oxygen, where R is at least one organic radical selected from the group consisting of alkyl, aryl, alkaryl and aralkyl radicals and mixtures thereof and where $x$ corresponds to the valence of E.

It is not precisely known what occurs when the esters disclosed herein are used in the phthalocyanine reaction or synthesis but it is believed that the ester hydrolyzes during the reaction to produce the alcohol again which is eliminated from the system rapidly without any appreciable loss in reaction efficiency and no loss in rapid heat-up time. The residue is believed to be temporarily in the form of , an ion or charged complex, where E is the element, O is oxygen and c represents the residual positive or negative charge(s) on the ion or complex. The ion or complex is apparently soluble in the nitrogen donor or in the other reactants in the system. The ion or charged complex then catalyzes the phthalocyanine reaction or may form an intermediate during the reaction which subsequently either decomposes to form the phthalocyanine molecule or is replaced in the phthalocyanine molecule by the metal donor. It is believed that it is only necessary to have a portion of the ion or complex in the solution or electrolyte such as urea at any given time to provide the desired catalytic activity for the reaction. Whatever the true nature of the reaction may be, it has been observed that, unless the element is in the form of an ion or complex, high yields of good quality pigments are not obtained. For example, if the dried oxide of the element, mixtures of the dried oxide and alcohol, or alcohol are used as catalysts, little or no pigment is obtained. Other important considerations in the use of the esters disclosed herein are that the alcohols or other hydroxy compounds produced by hydrolysis of the ester are present only in a relatively small amount, and readily vaporize or are inert in the reaction medium so that efficiency of the reaction is maintained. Because the esters themselves are noncorrosive and relatively harmless to the equipment, they can readily be handled. The esters rapidly hydrolyze in the reaction medium to provide without delay the requisite number of ions or complexes for catalytic activity.

The catalyst is employed in the phthalocyanine reaction in a minor amount. However, for best results, there should be used about at least 1 mol of catalyst, computed as metallic ions, for every 4 mols of the phthalocyanine forming material or for every mol of the pigment obtained. Preferably, an excess over this amount is used. If an insufficient amount of catalyst is employed, the reaction proceeds at a slower rate to produce smaller yields of product of larger particle size as well as dirty colors which, of course, are to be avoided. Very large amounts of catalysts are unnecessary as no appreciable increase in conversion is realized. None of the catalyst is recoverable, however, at the end of the reaction in the ester-activated condition. Apparently, while the element may be in the form of an oxide, its catalytic activity has been changed or eliminated. Of the catalysts disclosed above it is preferred to employ the titanium and zirconium esters, such as tetramethyl titante, tetraethyl titanate, tetrabutyl titanate, tetramethyl zirconate, tetraethyl zirconate, tetrapropyl zirconate, and the like, and mixtures thereof, as catalysts to obtain the highest yields and best colors and for ease in preparation.

The phthalocyanine forming material includes orthophthalic acid and its derivatives and mixtures thereof useful in producing phthalocyanine coloring matters or pigments. This term, thus, includes phthalic acid, phthalic anyhydride, phthalic acid monoamide, phthaldiamide, phthalimide, phthalimimide, monoammonium phthalate, monoammonium o-carbamyl-benzoate, monoammonium o-cyano-benzoate, o-cyano-benzoic acid, o-cyano-benzamide, and the like. There are also included in this term the halogenated derivatives of the applicable compounds such as the mono, di, tri and terabromo or chloro phthalic acids, their derivatives, as well as the halogenated mono and diammonium salts, the anhydrides, imides, mono and diamides, imimides, the orthocyanobenzamides, the lower monoalkyl esters such as the methyl and ethyl esters and other halogenated derivatives of phthalic acid, and mixtures thereof. In place of halogen derivatives, the alkoxy derivatives of such compounds may be employed. The phthalocyanine forming material thus includes substituted and unsubstituted orthophthalic acid and its derivatives and mixtures thereof which are useful in forming phthalocyanine pigments varying generally from blue to green in color.

The phthalocyanine forming metal donor reagent which supplies metal ions under the conditions of the reaction can be any metal heretofore used for producing metal phthalocyanine pigments. In general, the polyvalent metals are used such as copper, nickel, iron, cobalt, vanadium, tin, chromium, lead and the like although other metals such as aluminum, cadmium, magnesium and zinc may also be employed successfully as metal donors. The free metal or its salt may be employed. The amount of metal donor employed is sufficient to obtain the desired amount of metal in the resulting pigment and usually will amount in moles to about a fourth of the amount of the phthalocyanine forming material used. Preferably a slight excess of the donor metal is provided in the reaction to insure that sufficient metal ions are present to enter the phthalocyanine molecule. Moreover, oxidizing agents such as permanganates may also be employed to oxidize the metals. Of the various metals employed it is preferable to employ copper as a donor in the form of copper chloride or copper nitrate to obtain the most useful pigment and highest yields.

Solvents suitable for the reaction producing phthalocyanine pigments are inert organic solvents having a sufficiently high boiling point, up to about 250° C., to remain liquid under the conditions of the reaction. Examples of such solvents are trichlorobenzene, chlorobenzene, dichlorobenzene, naphthalene and its chlorinated derivatives, quinoline, benzophenone, nitrobenzene, etc. Sufficient solvent is employed to dissolve or disperse the reactants and to maintain a liquid mass of some fluidity.

The nitrogen supplying material or donor used in the reaction may be urea, biuret, guanidine, guanylurea, dicyandiamide or cyanuric acid and the like. While the amount of the nitrogen donor can vary within a wide range, it is preferred to employ an excess over the theoretical amount necessary to form the phthalocyanine pigment since some of the nitrogen donor may decompose or react to produce ammonia which may escape from the system or be unavailable for producing the pigment and also because the excess amount of the nitrogen donor acts as a flux for the reactants and affords to the reaction mass a suitable consistency for manipulation and maintenance of homogeneity. Thus, the ratio in mols of the amount of the nitrogen donor to the phthalocyanine forming material may vary from about 1:1 to 5:1 or more. More preferably, from about 3 to 7 mols of the nitrogen donor per mol of the phthalocyanine forming material are used to provide optimum reaction conditions. However, where nitrogen derivatives of the phthalocyanine forming materials are used such as the imides, the amides, and the imimides, which already contain a portion of the nitrogen necessary for formation of the phthalocyanine molecule, smaller quantities of the nitrogen donor may be employed.

The reaction to produce the phthalocyanine materials of the present invention may be carried out in a vessel open to the atmosphere or in a vessel closed to develop autogenous pressure. The reaction vessel should be lined with a material which will not poison the reaction nor introduce amounts of deleterious materials to dirty the color of the pigment produced. Hence, the vessel should preferably be glass lined. The reaction vessel should also be fitted with an agitator and a reflux column if open to the air and a vent for the noncondensables.

The reactants may be added to the reaction vessel, singly or together, in any order; when solid, they are preferably first pulverized to insure a high rate of reaction. After introduction into the reaction vessel, the mixture is rapidly heated up to the reaction temperature range of from about 150 to 250° C., preferably from about 175 to 185° C. to afford the best reaction rate and yield of pigment displaying satisfactory pigmental strength and brillance. A feature of the method of the present invention is that it is unnecessary to slowly heat to the reaction temperature to gradually remove the water from the system. The time of heating at the reaction temperature will vary somewhat depending on the volume of the reaction mixture, the temperature, degree of agitation, and the like. Therefore, the time of heating is chosen to obtain the highest yield of the pigment. Extended reaction periods are uneconomical. Heating at the reaction temperature for more than about 3 hours fails to increase appreciably the yield of pigment. For a temperature range of about 175–185° C., the reaction time will vary from 1–3 hours. The mixture is constantly agitated during both the heat-up and the reaction periods.

At the end of the reaction period, the phthalocyanine pigment can be filtered hot or cold, and the filter cake obtained is leached with one or more solvents such as trichlorobenzene, benzene and ethanol to remove the original solvent and other materials soluble in the organic solvent. Instead of using benzene and ethanol, the trichlorobenzene remaining after washing can be removed by vacuum drying. After this solvent treatment or drying step, the filter cake is broken up and suspended in a weak solution of sulfuric acid which may be warmed, filtered and washed with water until the filtrate is about neutral. The filter cake is next treated with a dilute solution of caustic, filtered, washed until the filtrate again is about neutral and may be dried. The procedure of treating the phthalocyanine pigment filter cake first with dilute acid and then with dilute caustic is preferred since it was observed that, when the order of treatment was reversed, the caustic precipitated metallic hydroxides and oxides as dark protective films over small amounts of unreacted phthalocyanine forming material, nitrogen donor compounds or polymers and other substances. Further, the caustic liberated gaseous ammonia that induced troublesome frothing. Subsequent treatment with dilute acid removed the protective films from the suspended solids whereupon the nitrogen donor compounds or polymers dissolved. However, the unreacted phthalocyanine forming material remained to dilute the resulting pigment. Moreover, the acid pasting process did not remove the unreacted phthalocyanine forming material which remained to dilute the finished color. In contrast, the preferred order of refining the pigment eliminated the troublesome frothing caused by ammonia evolution during the caustic treatment and prevented unreacted phthalocyanine forming material from getting into the finished color. Any residual metal oxide remaining after the acid and caustic treatment steps may be removed by treatment with strong (50%) $H_2SO_4$, filtering and washing the pigment until the filtrate is neutral.

During the reaction and during the refining steps, the by-products and unreacted starting materials, etc., obtained may be discharged to the atmosphere, to waste, or to storage for refining and further use if desired.

The refined color can then be conditioned or finished by any one of a number of methods to prepare it for use. One procedure involves solution of the pigment, if soluble in acid, in about 10 parts of very strong sulfuric acid followed by pouring into sufficient crushed ice to give a final slurry containing about 15% acid. The pigment is separated from the slurry and the resulting pigment paste is washed and then either laked or dried as desired. Additionally or alternatively, the pigment may be ball milled in the presence of an organic diluent to obtain the desired particle size. Ball milling is especially useful in reducing the particle size of those pigments neither soluble in concentrated sulfuric acid nor responsive to acid pasting. After finishing, the pigment may then be treated with various oils, resins, etc., and incorporated with the usual compounding ingredients in paints, enamels, lacquers, plastics, such as rigid or plasticized polyvinyl chloride or copolymerized vinyl chloride-vinylidene chloride materials, rubbers, and the like, to color the same.

The following examples will serve to illustrate the invention with more particularity to those skilled in the art:

Example I

Titanium tetrachloride was reacted with an excess of essentially anhydrous methanol in hexane while anhydrous ammonia gas was passed through the system. During the reaction HCl was evolved and reacted with the ammonia. At the end of the reaction, the mixture was filtered to remove the ammonium chloride whereupon the filtrate was distilled to eliminate the hexane and excess methanol. The residue, tetramethyl titanate, $Ti(OCH_3)_4$, was then added to the other ingredients of the phthalocyanine reaction in a reactor fitted with a stirrer, condenser and thermometer. The components used in the reaction and their approximate relative amounts are indicated below:

| Components | Grams | Mols | Mol Ratio |
|---|---|---|---|
| Trichlorobenzene | 865 | 4.5 | 22.5 |
| Tetrachlorophthalic anhydride | 57.2 | .2 | 1.0 |
| Urea | 80 | 1.3 | 6.67 |
| Cupric nitrate, trihydrate | 13.5 | .056 | .28 |
| Tetramethyl titanate | 8 | .0466 | .23 |

The mixture was then heated rapidly from room temperature to a temperature of about 175° C. with agitation. Heating of the mixture while agitated was then continued for 2½ hours during which time the temperature rose to 185° C. The reaction which is believed to have occurred can be represented by the following equation:

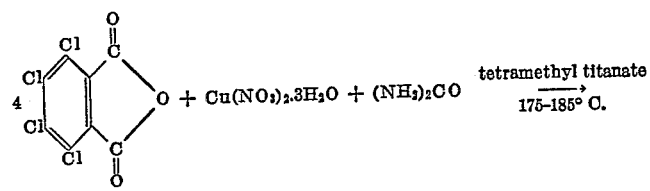

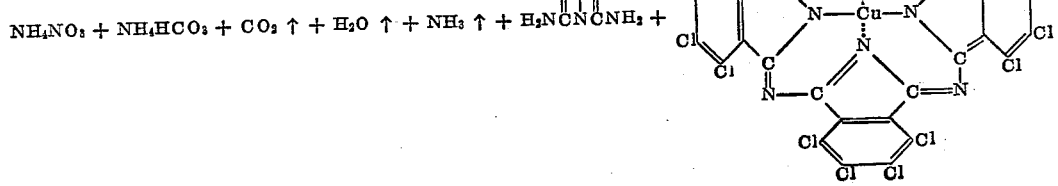

At the end of the reaction period, the heater was removed which allowed the batch to cool naturally. The temperature fell rapidly (about 2° C. per minute); and when it had fallen below 140° C., the pigment was filtered off on a suction filter. Rinsings of the reaction vessel, agitator, thermometer and lid with trichlorobenzene were added to the filter. Small portions of fresh trichlorobenzene were then poured over the filter cake to displace the saturated trichlorobenzene. Two rinsings of the filter cake with benzene displaced the trichlorobenzene and two rinsings with ethanol displaced the benzene. The crude ethanol-wet cake was mashed into small lumps (¼" to ½") and added with moderate stirring to dilute sulfuric acid (2 liters of 2% acid in a 4 liter beaker) at about 50° C. The slurry was warmed to 85° C. as promptly as possible (about 1 hour on an electric hotplate) and kept at 85 to 95° C. for 2 hours, adding make-up water from time to time. The temperature was kept at 95° C. or below both to avoid stabilization of gas bubbles, due to gas-vapor-steam evolution, by the pigment particles and to prevent a rapid increase in volume and subsequent overflow. At the end of the period, the mixture was filtered by suction. Washing of the cake with hot tap water was continued until the filtrate tested to a pH of 5-7. Next, the filter cake was mashed and added to dilute sodium hydroxide solution (2 liters of 2% base in a 4 liter beaker) using the same temperature and time limits set forth above with respect to the acid treatment step. Washing of the caustic treated filter cake was complete when the final rinsing filtrate tested to a pH of 7-8. The washed cake was then dried and weighed. The yield of pigment was about 93.6% of the theoretical yield.

*Example II*

This example was the same as Example I, above, except that tetramethyl zirconate was used as a catalyst in place of tetramethyl titanate. This ester was prepared in a manner similar to the preparation of the titanate ester. The yield of pigment obtained was about 86% of the theoretical.

*Example III*

The method of this example was similar to that of Example I, above, except that tetrabutyl titanate was used in place of tetramethyl titanate as the catalyst; the proportions of the components of the reaction mixture were varied somewhat; and the reaction slurry was vacuum filtered in a ceramic filter crock, reslurried with hexane and vacuum filtered instead of being treated with trichlorobenzene, benzene and ethanol and dried. Then the dried pigment was treated with acid and caustic as in Example I. The approximate proportions of the ingredients and the yield obtained are set forth below:

| Component | Parts by Weight | Mol Ratio |
| --- | --- | --- |
| Trichlorobenzene | 182.50 lbs | 29.4 |
| Tetrachlorophthalic anhydride | 9.65 lbs | 1 |
| Urea | 13.45 lbs | 6.5 |
| Cupric nitrate, trihydrate (Cu(NO$_3$)$_2$.3H$_2$O) | 2.26 lbs | .28 |
| Tetrabutyl titanate | 2.67 lbs | .23 |
| Temperature, ° C | 175-180 | |
| Time of Reaction, Hrs | 2½ | |
| Yield of Pigment, Percent of Theoretical | 92 | |

When this example was repeated and the temperature allowed to rise to 185° C., or to be in the range of 175-185° C. for the indicated period of time, the yield of pigment was about 95% of the theoretical yield.

In summary, the present invention teaches that the use of hydrolyzable alkyl, aryl, alkaryl and aralkyl esters of an oxide gel-forming element of groups IV, V and VI of the periodic table having an atomic weight of at least 28 and especially alkyl, aryl, alkaryl and aralkyl, titanate and zirconate esters as catalysts in the phthalocyanine reaction will provide yields of pigments approximating the theoretical yield. The pigments are also clean and of a fine particle size. The esters are readily prepared and their use in the phthalocyanine reaction does not involve any special technique or equipment. Moreover, the lack of corrosiveness of the catalyst and the fact that the method is relatively rapid in that it does not require preliminary removal of water from the system makes for economy in production. Accordingly, it is apparent that the use of the novel method of the present invention will contribute substantially toward reduction of the cost of obtaining high grade phthalocyanine pigments.

What is claimed is:

1. The method for producing metal phthalocyanine pigments which comprises heating in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one hydrolyzable ester having the formula $E(OR)_x$ where E is an element selected from the group consisting of titanium and zirconium, where O is oxygen, where R is selected from the group consisting of alkyl, aryl, alkaryl and aralkyl radicals and where $x$ corresponds to the valence of E and mixtures thereof to a temperature and for a time sufficient to form a phthalocyanine pigment.

2. The method of producing metal phthalocyanine pigments which comprises heating with agitation in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one hydrolyzable ester having the formula $E(OR)_x$ where E is an element selected from the group consisting of titanium and zirconium, where O is oxygen, where R is selected from the group consisting of alkyl, aryl, alkaryl and aralkyl radicals and where $x$ corresponds to the valence of E and mixtures thereof to a temperature of from about 150 to 250° C. and for a period of time sufficient to form a phthalocyanine pigment.

3. The method for producing metal phthalocyanine pigments which comprises mixing together an inert organic high boiling point solvent, a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetra-bromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one hydrolyzable ester having the formula $E(OR)_x$ where E is an element selected from the group consisting of titanium and zirconium, where O is oxygen, where R is selected from the group consisting of alkyl, aryl, alkaryl and aralkyl radicals and where $x$ corresponds to the valence of E and mixtures thereof to form a mixture, slowly heating said mixture while agitating the same to a temperature of from about 175 to 185° C., heating and agitating said mixture at said temperature for from 1 to 3 hours to form said pigment and separating the pigment produced from the reaction mixture.

4. The method for producing metal phthalocyanine pigments according to claim 2 containing the additional steps of filtering the phthalocyanine pigment reaction mass to obtain a filter cake, washing the filter cake successively with an organic solvent, dilute mineral acid and dilute inorganic base and removing said solvent, acid and base from said cake after each washing step.

5. The method for producing metal phthalocyanine pigments according to claim 4 where said catalyst is tetramethyl titanate, $Ti(OCH_3)_4$.

6. The method for producing metal phthalocyanine pigments according to claim 4 where said catalyst is tetrabutyl titanate, $Ti(OC_4H_9)_4$.

7. The method for producing metal phthalocyanine pigments according to claim 4 where said catalyst is tetramethyl zirconate, $Zr(OCH_3)_4$.

8. The method for producing metal phthalocyanine pigments according to claim 4 where said phthalocyanine forming metal donor reagent is copper nitrate.

9. The method for producing metal phthalocyanine pigments according to claim 4 where said phthalocyanine forming material is tetrachlorophthalic anhydride.

10. The method for producing metal phthalocyanine pigments which comprises reacting at a temperature of from about 175 to 185° C. for about 2½ hours the following ingredients in the ratios named:

About 29.4 mols of trichlorobenzene
About 1 mol of tetrachlorophthalic anhydride
About 6.5 mols of urea
About 0.28 mol of cupric nitrate trihydrate, and
About 0.23 mol of tetrabutyl titanate.

References Cited in the file of this patent
UNITED STATES PATENTS

| | | |
|---|---|---|
| 2,276,598 | Stocker et al. | Mar. 17, 1942 |
| 2,410,301 | O'Neal | Oct. 29, 1946 |
| 2,549,842 | Moser | Apr. 24, 1951 |
| 2,662,896 | Pedersen | Dec. 15, 1953 |
| 2,727,043 | Rosch et al. | Dec. 13, 1955 |
| 2,772,284 | Barnhart et al. | Nov. 27, 1956 |